US012176718B2

(12) United States Patent
Tran

(10) Patent No.: US 12,176,718 B2
(45) Date of Patent: Dec. 24, 2024

(54) ELECTRICAL ARCHITECTURE COMPRISING A LINEAR PHOTOVOLTAIC INSTALLATION CONSISTING OF MULTIPLE GROUPS OF PHOTOVOLTAIC PANELS AND A DC NETWORK, CONNECTED TO AN AC TRANSPORT NETWORK AND/OR AN AC DISTRIBUTION NETWORK WITH POSSIBLE TRANSPORT OF POWER FROM THE AC NETWORK BY THE DC NETWORK

(71) Applicant: COMMISSARIAT A L'ENERGIE ATOMIQUE ET AUX ENERGIES ALTERNATIVES, Paris (FR)

(72) Inventor: Quoc-Tuan Tran, Grenoble (FR)

(73) Assignee: COMMISSARIAT A L'ENERGIE ATOMIQUE ET AUX ENERGIES, ALTERNATIVES Paris (FR)

(*) Notice: Subject to any disclaimer, the term of this patent is extended or adjusted under 35 U.S.C. 154(b) by 8 days.

(21) Appl. No.: 18/066,562

(22) Filed: Dec. 15, 2022

(65) Prior Publication Data
US 2023/0198265 A1 Jun. 22, 2023

(30) Foreign Application Priority Data
Dec. 20, 2021 (FR) .................. 21 14044

(51) Int. Cl.
*H02J 3/38* (2006.01)
*H02J 3/00* (2006.01)
(Continued)

(52) U.S. Cl.
CPC .............. *H02J 3/381* (2013.01); *H02J 3/001* (2020.01); *H02J 3/32* (2013.01); *H02J 3/36* (2013.01);
(Continued)

(58) Field of Classification Search
CPC .......... H02J 3/381; H02J 3/36; H02J 2300/24; H02J 5/00; H02J 2300/40; F05B 2240/9113; H02S 20/21
See application file for complete search history.

(56) References Cited

U.S. PATENT DOCUMENTS

2014/0091630 A1 4/2014 Kim et al.
2014/0379157 A1* 12/2014 Das .......................... H02J 3/38
700/295
(Continued)

FOREIGN PATENT DOCUMENTS

CN 102545200 A * 7/2012 ............ H02J 3/0073
CN 108539776 A * 9/2018 ............ H02J 3/0073

OTHER PUBLICATIONS

French Preliminary Search Report issued Jul. 27, 2022 in French Application 21 14044, filed on Dec. 20, 2021 (with English Translation of Categories of cited documents), 3 pages.
(Continued)

*Primary Examiner* — Ryan Johnson
(74) *Attorney, Agent, or Firm* — Oblon, McClelland, Maier & Neustadt, L.L.P.

(57) ABSTRACT

An architecture with at least one PV linear installation with a DC network and in interconnecting this subassembly, at at least two distinct interconnection points, with a preferably existing AC electricity network. Each interconnection point to a node of the AC network is a voltage source converter VSC that is able to inject from 0 to 100% of the maximum power P of the PV linear installations.

13 Claims, 11 Drawing Sheets

(51) Int. Cl.
*H02J 3/32* (2006.01)
*H02J 3/36* (2006.01)
*H02J 5/00* (2016.01)

(52) U.S. Cl.
CPC ............ *H02J 5/00* (2013.01); *H02J 2300/24* (2020.01); *H02J 2300/28* (2020.01); *H02J 2300/40* (2020.01)

(56) References Cited

U.S. PATENT DOCUMENTS

| | | |
|---|---|---|
| 2019/0386571 A1 | 12/2019 | Dincan et al. |
| 2021/0126574 A1* | 4/2021 | Duggal ..................... E01C 1/00 |
| 2021/0135455 A1 | 5/2021 | Marinopoulos et al. |

OTHER PUBLICATIONS

Athay, T. et al. "A Practical Method for the Direct Analysis of Transient Stability", IEEE Transactions on Power Apparatus and Systems, vol. PAS-98, No. 2, 1979, pp. 573-584. (12 pages).
Pai, M. A. "Energy Function Analysis for Power System Stability", The Kluwer International Series in Engineering and Computer Science. Power Electronics and Power Systems, Boston: Kluwer Academic Publishers, 1989. (244 pages).
U.S. Appl. No. 18/066,552, filed Dec. 15, 2022.

\* cited by examiner

[Fig. 4A]

ELECTRICAL ARCHITECTURE COMPRISING A LINEAR PHOTOVOLTAIC INSTALLATION CONSISTING OF MULTIPLE GROUPS OF PHOTOVOLTAIC PANELS AND A DC NETWORK, CONNECTED TO AN AC TRANSPORT NETWORK AND/OR AN AC DISTRIBUTION NETWORK WITH POSSIBLE TRANSPORT OF POWER FROM THE AC NETWORK BY THE DC NETWORK

TECHNICAL FIELD

The present invention relates to the general field of electricity networks.

The invention relates more particularly to the interconnection between an alternating current (AC) transmission network and/or an alternating current (AC) distribution network and a linear photovoltaic installation.

A "PV linear installation" is understood here and within the scope of the invention to mean photovoltaic panels arranged in groups along a surface that extends mainly in a line and preferably on or along substrates that have been already built/fitted by humans, such as cycle tracks, motorway verges, railways, etc., or natural substrates, for example not able to be used for agricultural purposes.

"System services" are understood here and within the scope of the invention to mean solutions that ensure the continuous balance between electricity production and consumption. System services are thus services needed for any network manager and make it possible to ensure reliable, stable and efficient operation of the electricity network.

Throughout the application, the following acronyms are used for the sake of simplicity:
- AC: acronym for "Alternating Current"; DC: acronym for "Direct Current";
- MVDC: acronym for "Medium-Voltage Direct Current", typically within the range of 30 to 150 kilovolts (kV);
- HVDC: acronym for "High-Voltage Direct Current", typically beyond 150 kilovolts (kV);
- VSC: acronym for "Voltage Source Converter";
- MMC: acronym for "Modular Multilevel Converter".

PRIOR ART

The context of the high demand for renewable energies with the need for a dedicated electricity network, typically up to 30% in 2030 in France, and the expansion of the share of solar power in renewable energies, requires the installation of numerous photovoltaic (PV) solar plants on the ground having high powers, typically each of the order of a few hundred MW.

The issue of the land available for this PV technology therefore becomes crucial. Indeed, in view of the required surface areas, the deployment of large PV solar plants on the ground may lead to usage conflicts with agricultural land and affect biodiversity. For example, the most powerful PV solar plant in France today, with a power equal to 300 MW, is installed in Cestas, close to Bordeaux, over 260 hectares.

Finding new land to develop PV solar plant projects has therefore become the main concern for renewable energy developers.

In addition, given the desire of public authorities to limit the use of large agricultural spaces to install such PV plants on the ground, it is necessary to find ecologically acceptable alternatives.

One solution that addresses this problem is that of making use of what are called linear surfaces, in the form of substrates that have already been fitted/built by humans, such as cycle tracks, motorway verges, railways, etc., or natural substrates, not able to be used for agricultural purposes, such as along waterways and extending over tens or even hundreds of kilometres, to install high-power PV systems. These potential surfaces have the advantages of already being highly present, able to be used directly as they are for installation of PV panels thereon and inexpensive since they do not require the acquisition of land.

Implementing new types of linear PV installations/plants will therefore open up new opportunities in the strategy of PV development. Throughout the world, there are already a few linear PV installation projects, but these are a priori of low power, typically a few kW. In addition, very few articles on the design of these linear PV installations have been published.

Now, moving from PV plants occupying tens or hundreds of hectares to linear PV installations extending over tens of hectometres or kilometres means rethinking the entire architecture of the related electricity network.

Generally speaking, the European Union's strategies in terms of large-scale renewable energy development highlight the important roles of electricity infrastructure and sector coupling, i.e. interconnection between gas and electricity, so as to achieve deep decarbonization of economies.

There is therefore a need to propose an optimized technical solution with an electrical architecture that allows the mass connection of linear PV installations to the existing electricity infrastructure, while at the same time providing services that go beyond simply injecting PV production.

The aim of the invention is therefore to at least partially meet this need.

DISCLOSURE OF THE INVENTION

To this end, the invention relates, according to one of its aspects, to an electrical architecture comprising:
- at least one linear installation comprising at least one group of photovoltaic (PV) panels, configured to produce a maximum total power P, and
- a direct current (DC) network comprising at least one bus to which the one or more groups of PV panels are electrically connected in parallel each by way of a DC/DC converter,
- an alternating current (AC) transport and/or distribution network,
- at least two voltage source converters (VSC); one of the two converters connecting the DC bus to a first node of the AC network, the other of the two converters connecting the DC bus to a second node of the AC network, distinct from the first node, each of the VSC converters being adapted to inject from 0 to a value greater than 100% of the power P into the AC network, at least one of the converters being bidirectional,
- a control system adapted to determine the power to be transported between the DC network from the VSC converters and the AC network, on the basis of the requirements and/or operating regimes of the AC network.

Advantageously, the VSC converters are multilevel modular converters (MMC) and/or bidirectional ones and/or are dimensioned so as to absorb the power portion of the AC network.

The possible control modes for the VSC converters are:

Vac/f: Controlling the voltage at the connection point and the frequency of the AC network Vac-phi: Controlling the voltage at the connection point of the AC network and the phase difference Vdc-phi: Controlling the voltage of the DC bus and the phase difference Vdc-Q: Controlling the voltage of the DC bus and reactive power PWM-phi: Controlling the PWM modulation of the VSC inverter and the phase difference P-Vac: Controlling injected power and the voltage at the connection point of the AC network P-Q: Controlling active and reactive power injected into the AC network Vdc-Vac: Controlling the voltage of the DC bus and the voltage at the connection point of the AC network P-cos(f): Controlling active power injected into the AC network and the power factor Vdc-cos(f): Controlling the voltage at the DC bus and the power factor, etc.

Among all of these control modes, preference is given to the control modes P-Q; P-Vac; Vac/f; Vdc-Q for the transport and service function according to the invention.

According to one advantageous embodiment, the DC network of the linear installation comprises at least one high-voltage DC (HVDC) bus connected to the medium-voltage DC (MVDC) bus and to a voltage source converter (VSC) connected to a node of the AC network.

According to another advantageous embodiment, the DC network absorbs, at one of the first or second nodes, at least part of the power of the AC network in the event of failure thereof between the first and second nodes, for example in the event of loss of an AC line.

Advantageously, the VSC converters are multilevel modular converters (MMC) and/or bidirectional ones and/or are dimensioned so as to absorb the power portion of the AC network.

According to another advantageous embodiment, the bus to which the one or more groups of PV panels are directly electrically connected in parallel is a medium-voltage DC (MVDC) bus.

The MVDC bus may advantageously be connected to the AC distribution network and/or AC transport network.

According to one advantageous variant, the DC network of the PV linear installation comprises a high-voltage DC (HVDC) bus connected only to the AC transport network.

Advantageously, the VSC converters are multilevel modular converters (MMC).

According to one advantageous configuration, the bus to which the one or more groups of PV panels are directly electrically connected in parallel is a medium-voltage DC (MVDC) bus.

According to one advantageous variant embodiment, the architecture comprises multiple geographically distributed loads, such as high-power electric-vehicle charging stations or electrolysers for supplying hydrogen-operated vehicles, each connected to the MVDC bus by way of a DC/DC converter.

According to another advantageous variant embodiment, the architecture comprises multiple geographically distributed electricity storage means, such as batteries, each connected to the MVDC bus by way of a DC/DC converter.

According to another advantageous variant embodiment, the architecture comprises other geographically distributed current sources, such as wind turbines, each connected to the MVDC bus by way of a DC/DC converter.

According to one advantageous embodiment, the DC network of the PV linear installation comprises at least one high-voltage DC (HVDC) bus connected to the medium-voltage DC (MVDC) bus and to a voltage source converter (VSC) connected to a node of the AC network.

The control system may advantageously be connected to the supervisory control and data acquisition (SCADA) system of the AC network. This makes it possible to differentiate the power to be absorbed by one or the other of the at least two injection nodes.

According to another advantageous embodiment, the architecture comprises means for measuring voltage and/or frequency at the first and second nodes, connected to the control system such that it determines the power between the power to be transported between the DC network from the VSC converters and the AC network on the basis of the measurements that are performed.

The invention thus consists essentially in implementing a linear PV system, comprising groups of PV panels and a DC network, and in interconnecting this subassembly, at at least two interconnection points, with a preferably existing AC electricity network. Each interconnection point to a node of the AC network is a voltage source converter VSC that is able to recover the power of the AC network in order to transport it via the DC network.

The invention therefore consists in distributing the power to be transported between the DC network from the VSC converters and the AC network, on the basis of the requirements and/or operating regimes thereof.

According to one advantageous configuration, the DC network absorbs at least part of the power of the AC network in the event of failure thereof, for example in the event of loss of a line.

In contrast to a PV plant according to the prior art that is located at a precise point of the electricity network and therefore able to inject only at this point, the architecture according to the invention with a linear PV installation distributed over a wide geographical area allows interconnection at multiple remote points of the electricity network.

The architecture according to the invention makes it possible to retain and increase the high reliability and resilience of the existing electricity network while at the same time expanding its capability to integrate large amounts of renewable energy in the future through PV linear installations.

Ultimately, an architecture according to the invention has numerous advantages, including the following:

owing to the choice of linear installations,
- a considerable reduction in footprint along with a reduction in the building of HVAC lines;
- an increase in the capability of PV systems to penetrate into the existing AC electricity network;
- a reduction in the variation of PV production caused by intermittence, due to the aggregation of the linear installations over a large distance;

improvement in the flexibility of the network through the possibility of exchanging energy in both directions between a DC network and an AC network;

great reliability and resilience;

an improvement in the stability of the AC network;

the possibility of keeping continuity of service in the event of a fault or separation of the AC network;

simplification of energy management;

ease of connecting DC systems such as storage units and/or high-power fast-charging stations for electric vehicles and/or electrolysers and fuel cells to the DC network of the linear installations;

the possibility of coupling to offshore or onshore wind farms, etc.

the possibility of effective protection between an AC network and a DC network;

the reduction of total losses of the AC network through optimum power distribution.

Other advantages and features of the invention will become apparent from reading the detailed description of exemplary implementations of the invention, given by way of non-limiting illustration with reference to the figures that follow.

DETAILED DESCRIPTION

Figure 1:
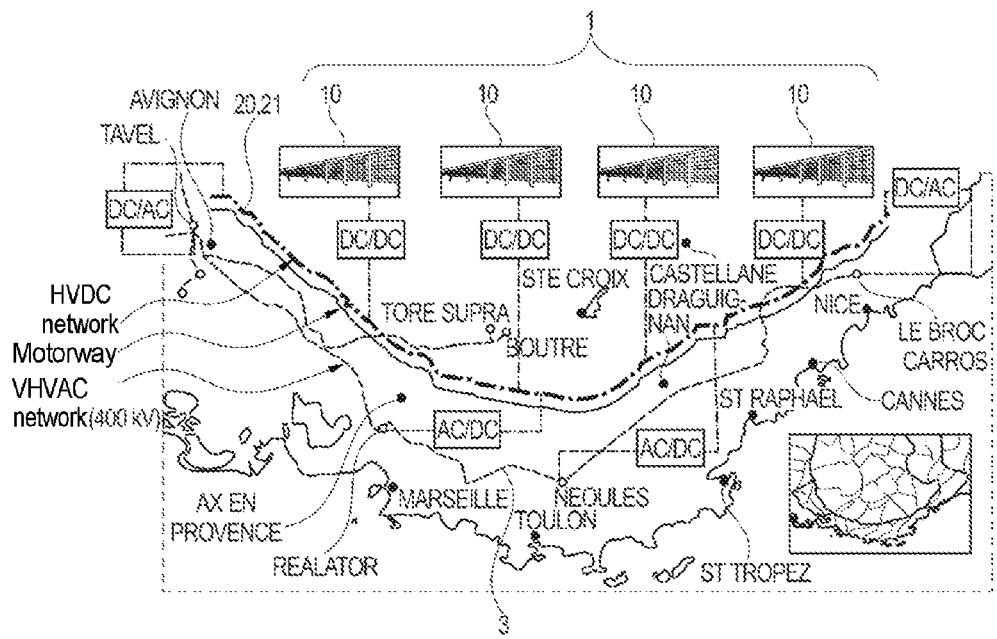
FIG. 1 schematically illustrates an electrical architecture according to the invention as could be installed in the south-east region of France.

FIG. 1 shows an architecture according to the invention as could be installed in the south-east region of France.

As illustrated, this electrical architecture comprises a plurality 1 of groups of photovoltaic (PV) panels 10, designed to produce a maximum total power P. These groups of panels 10 are distributed over hundreds of kilometres in this region, arranged on ground surfaces that extend over terrains that have already been built by humans, such as along edges of railways, motorways, etc.

All of these groups of panels are electrically connected in parallel by at least one bus 20, 21 of a DC network, so as to form a single linear PV installation. This linear PV installation is itself connected to the AC transport network 3 and/or AC distribution network 4 that already exists in this region. All of the groups of PV panels are therefore connected to one another by at least one DC bus 20, 21.

Figure 2:
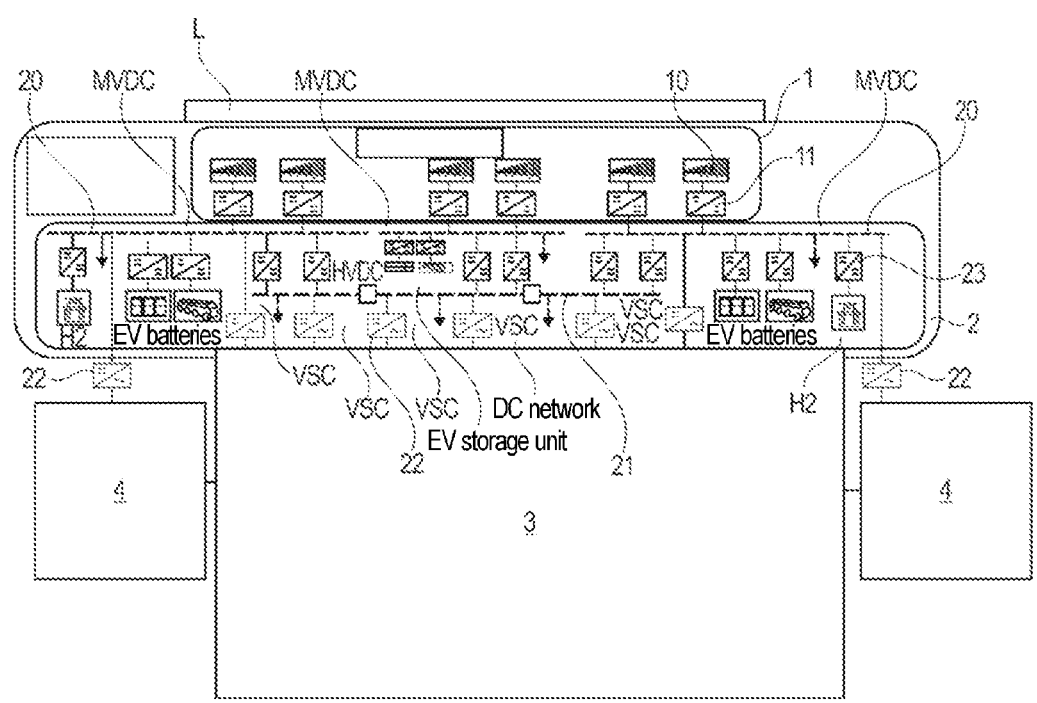
FIG. 2 is an overview of the electrical architecture according to the invention.

FIG. 2 shows, in more detail, the components and the possible connection modes according to one embodiment of such an architecture.

In this FIG. 2, the groups of PV panels are distributed along a line L on the ground. The plurality 1 of these PV groups is able to produce a maximum total power P.

The linear PV installation comprises the plurality of groups of panels along with the DC network 2, which here comprises multiple MVDC buses 20 to which the linear installations 10 are electrically connected in parallel, each by way of a DC/DC converter 11.

The DC network also comprises multiple HVDC buses 21 each connected to one or more of the MVDC buses 20. The HVDC buses 21 are able to transport the DC current over the entire DC network.

Each MVDC bus 20 or HVDC bus 21 is connected to a node of an AC transport network 3 or to that of an AC distribution network by way of a voltage source converter 22. At least one of the converters is bidirectional, so as to allow power to pass from the AC network to the DC network.

Preferably, the VSC converters 22 are multilevel modular converters (MMC).

Each of the VSC converters 22 is designed to inject from 0 to 100% of the power P into the AC network. At least one of the converters is designed to inject more than 100% of the power P into the AC network.

According to the invention, the control system for controlling the architecture is designed to distribute the power to be transported between the DC network from the VSC converters 22 and the AC network, on the basis of the requirements and/or operating regimes thereof.

The control system may be integrated into the supervisory control and data acquisition (SCADA) system of the AC network.

In one advantageous configuration, the DC network absorbs at least part of the power of the AC network in the event of failure thereof, for example in the event of loss of an AC line. In other words, the DC network of the PV linear installation makes it possible to avoid network congestion.

Furthermore, the control system allows the electrical architecture to contribute to at least some of the system services of the AC network by virtue of the DC network of the PV linear installation.

Within the scope of the invention, the system services may be summarized as follows
- S1: frequency regulation (managing active power reserves, primary frequency regulation, secondary frequency regulation and tertiary frequency regulation);
- S2: voltage regulation;
- S3: improving network stability (frequency, voltage and rotor angle or angular frequency of synchronous machines) and reducing power oscillations;
- S4: support capability in the event of a short circuit such as firewall and increase in the resilience of the AC electrical network;
- S5: managing congestion by controlling the transit of power;
- S6: compensating for transport losses through optimum power distribution;
- S7: autonomous startup ("black start");
- S8: non-synchronous coupling of electrical zones, making it possible to achieve coupling between two networks operating at different frequencies, for example at 50 Hz and 60 Hz;
- S9: fast charging of electric vehicles along the DC network.

As also illustrated in this FIG. 2, the DC network of the architecture has multiple geographically distributed loads, such as high-power electric-vehicle (EV) charging stations or electrolysers ($H_2$) for hydrogen vehicles. Each of these loads is connected directly to the MVDC bus 20 by way of a DC/DC converter 23.

The DC network may also support multiple geographically distributed electricity storage means, such as batteries. Each storage means is also connected directly to the MVDC bus 20 by way of a DC/DC converter 23.

Figure 3:
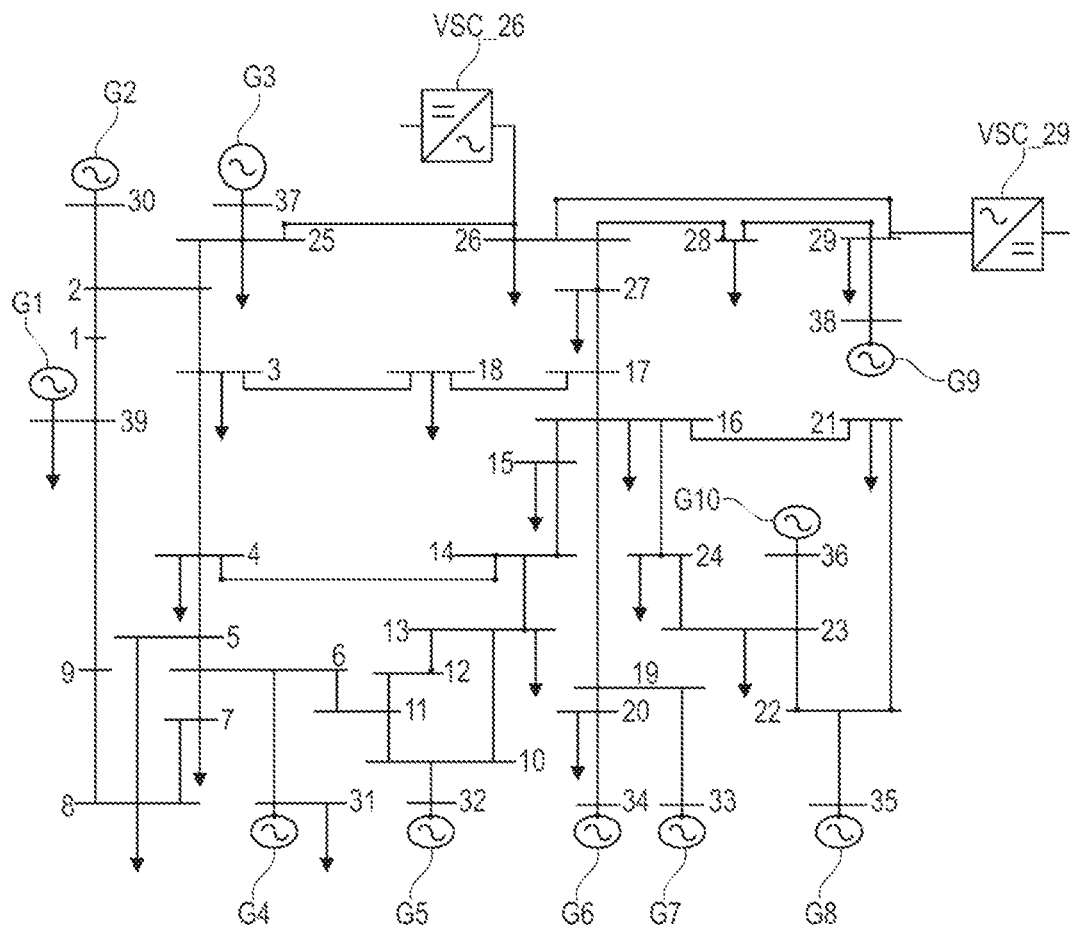
FIG. 3 is a schematic view of the "New England IEEE 39-node" test network on which the tests of injecting power from the DC network in line with the electrical architecture of the invention were carried out.

Validations of the architecture proposed according to the invention were carried out on the IEEE New England 39-node test AC transport network. This AC network, shown schematically in FIG. 3, is a simplification of the New England network in north-east America. It comprises 39 nodes (numbered from 0 to 39), including 10 production nodes and 46 lines. The generators at the production nodes are referenced G1 to G10. In particular, at node 29, there is a generator G9.

The total production and consumption of the New England AC network are 6147 MW and 6097 MW, respectively.

The validations performed on this New England network are carried out with the software marketed under the name "Powerfactory" by Digsilent.

The validation test hypotheses are given considering a number of six groups of PV panels electrically connected in parallel to a DC bus within a linear PV installation. The maximum power of each PV group is 50 MW, i.e. a total maximum power P of 300 MW.

The DC bus is connected to two VSC converters, which are connected to the New England AC network at nodes 26 and 29, referenced VSC_26 and VSC_29, respectively.

In other words, in tests A/ and B/ below, these two VSC converters, VSC_26 and VSC_29, inject the production of the six PV groups onto the New England AC network.

The overview of the test configuration is shown in FIG. 3.

And, by way of comparison, in tests A/ and B/, the New England AC network is considered without a DC network, i.e. without any PV linear installation or any VSC converter at the nodes.

A/ Congestion Test

In this test, the loss of a line of the AC network, between nodes 28 and 29, is simulated, and then the various powers respectively on the lines of the AC network between nodes 26 and 28 and between nodes 28 and 29, on the one hand, and at the converters VSC_26 and VSC_29, on the other hand, are observed.

Figure 4A:
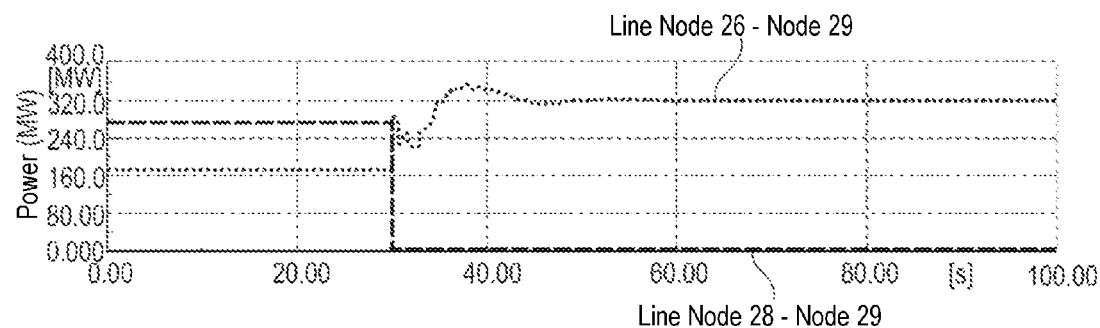
FIGS. 4A and 4B illustrate distributions of power on lines of the New England network and two VSC converters of a DC network with six PV linear installations connected to the New England network, following a line loss test.
Figure 4B:
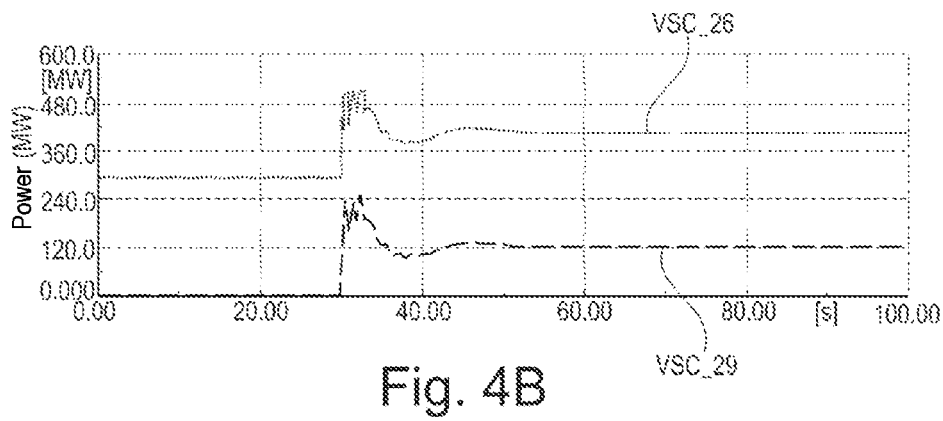

This simulation is illustrated on the curves in FIGS. 4A and 4B, which show the various successive phases of the test:
- i/ Before the loss of the line between nodes 28 and 29, the transit of power on the AC network is 275 MW on the line between nodes 28 and 29 and 174 MW on the line between nodes 26 and 29.

The power at the converters VSC26 and VSC29 is 291 MW and 0 MW, respectively.
- ii/ The loss of the line between nodes 28 and 29 triggered at the end of a time t equal to 30 s.
- iii/ After the loss of this line between nodes 28 and 29, the transit of power on the AC network is 0 MW on the line between nodes 28 and 29 and 322 MW on the line between nodes 26 and 29.

The power at the converters VSC_26 and VSC_29 is 408 and 128 MW, respectively.

By way of comparison, without the presence of the PV groups and the converters VSC_26 and VSC_29, the transit of power on the line between nodes 26 and 29 is 450 MW. There is an overload on this line of the AC network.

It therefore becomes apparent that, with the presence of the PV groups and the converters VSC_26 and VSC_29, the transit of power is distributed between the line between nodes 26 and 29 (322 MW) and the DC network of the PV linear installation (128 MW).

Therefore, the DC network of the PV linear installation absorbs a significant portion of power. And congestion of the AC network is avoided (S5).

B/ Stability Test

The test consists here of a short circuit in order to study the resistance capability of the PV linear installation, and therefore its influence on the stability of the AC network.

At the time t equal to 1.5 s, the occurrence of a short circuit on node 28 is simulated, this being eliminated at t equal to 1.7 s, i.e. 200 ms after its occurrence.

B1/ Without the presence of a PV linear installation and the converters VSC_26 and VSC_29, it is observed that the AC network becomes unstable as soon as the short circuit occurs.

Figure 5:
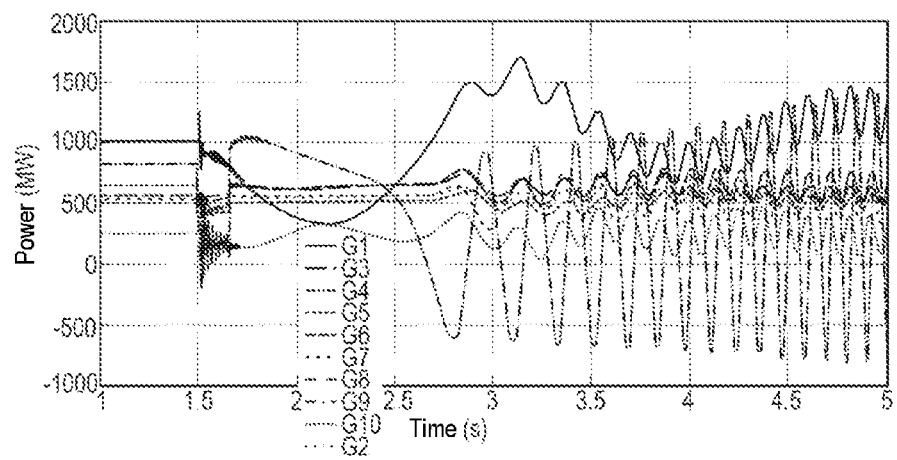
FIGS. 5, 6, 7 respectively illustrate the variation in power, rotor angle and speed of the generators (synchronous machines) of the New England network without the architecture according to the invention, following a short-circuit test.

Indeed, as shown in FIG. 5, which illustrates the temporal variation in the power of the generators (synchronous machines), there is a significant oscillation in power for all of the generators G1 to G10.

Figure 6:
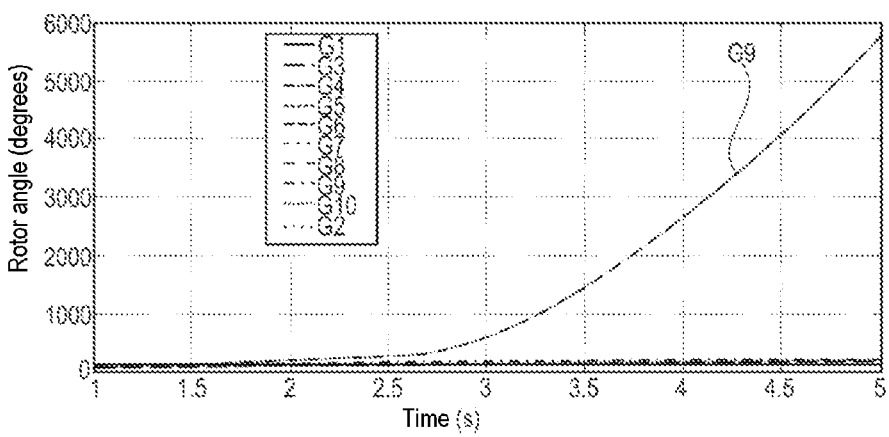
Figure 7:
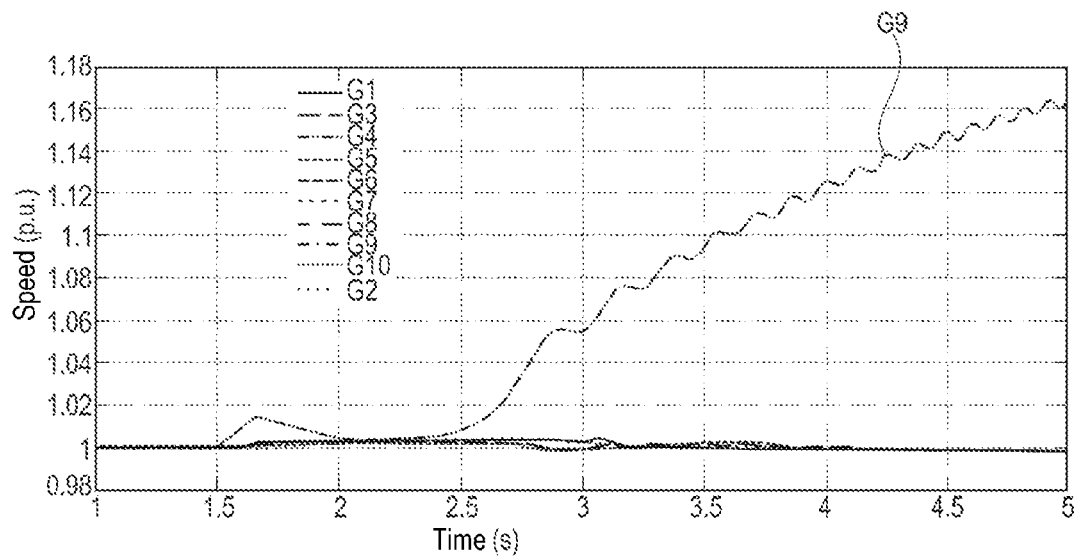

Furthermore, a loss of angular stability (FIG. 6) and a loss of synchronization following an increase in speed (FIG. 7) is observed for the machine G9, since G9 is located very close to the short-circuit point (node 26).

Figure 8:
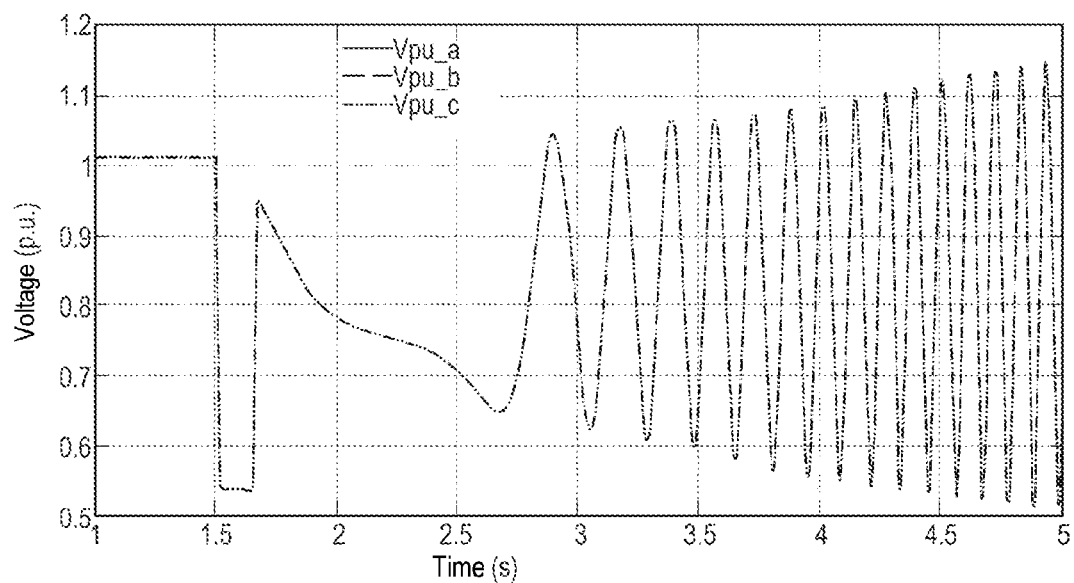
FIGS. 8 and 9 respectively illustrate the variation in voltage at a node and frequency of the New England network without the architecture according to the invention, following the short-circuit test.
Figure 9:
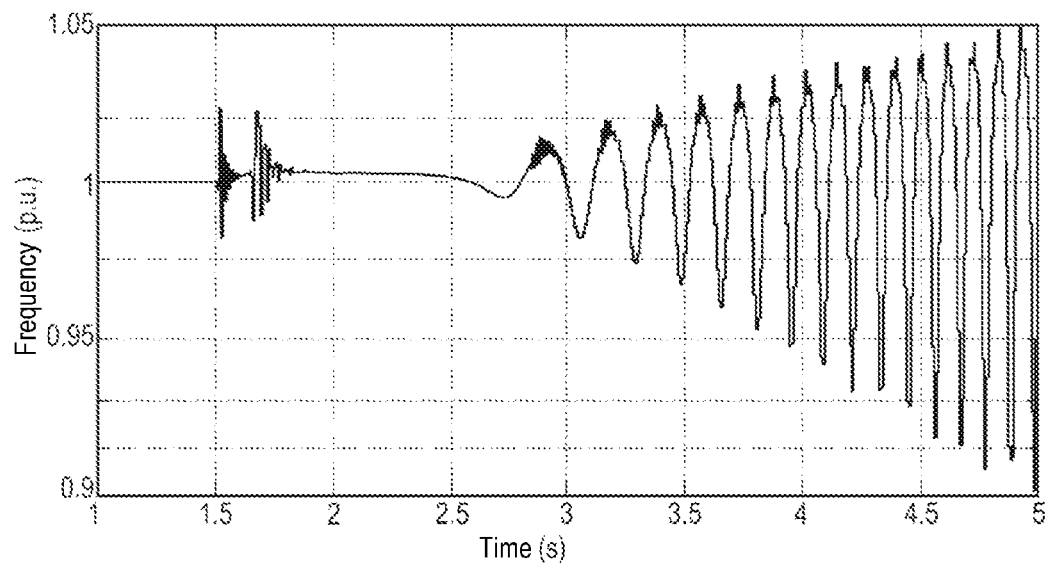

The AC network loses voltage frequency and frequency stability, as illustrated respectively in FIG. 8, which shows the voltage variation per unit (p.u.) at node 28, and in FIG. 9, which illustrates the frequency variation per unit (p.u.).

B2/ Consideration is given here to the DC network of the PV linear installation, with the six PV groups, which injects a power with a distribution of 200 MW onto VSC_26 connected to node 26 and 100 MW onto VSC_29 connected to node 29.

Figure 10:
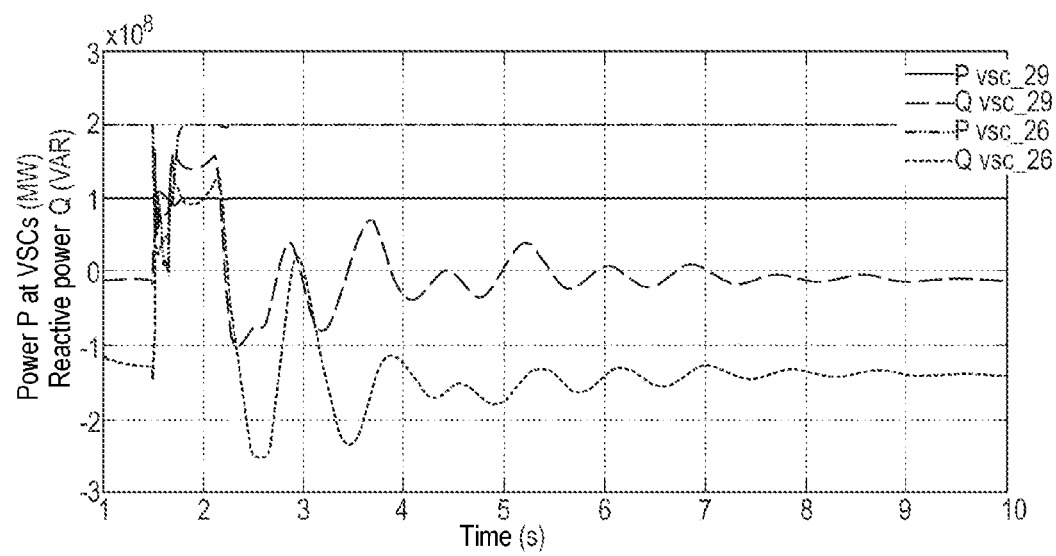
FIG. 10 illustrates the variation in power and reactive power at the two VSC converters of the architecture according to the invention with the New England network and in a first configuration of injecting differentiated power onto the two VSCs, following a short-circuit test.

FIG. 10 illustrates the variation in the active and reactive powers of VSC_26 connected to node 26 and VSC_29 connected to node 29.

It is therefore observed that, in the event of a short circuit, the network is kept stable, by virtue of the highly efficient control system, via the two converters VSC_26 and VSC_29. This test case B2/ demonstrates the very good resistance capability of the PV linear installation in the event of a short circuit on the AC network (S4). The converter VSC_26 is highly impacted by the short circuit as it is close to node 26, where the short-circuit point is. The converter VSC_26 participates highly actively in supplying reactive power to recover the voltage at the connection node. After the short circuit, the two converters VSC_26 and VSC_29 operate normally.

Figure 11:
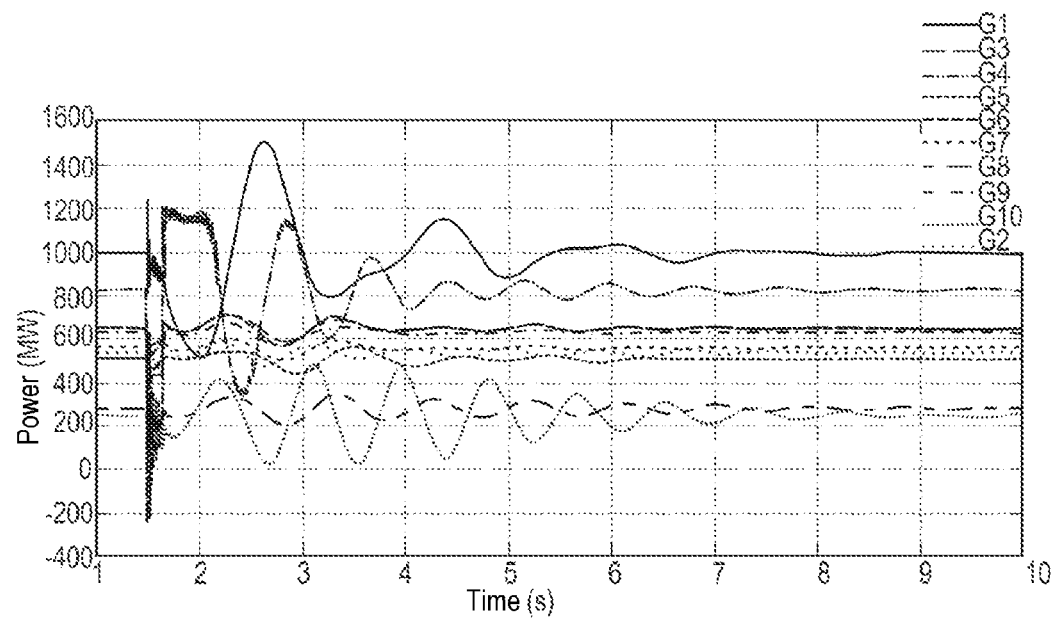
FIGS. 11, 12, 13 respectively illustrate the variation in power, rotor angle and speed of the generators (synchronous machines) of the New England network with the architecture according to the invention and in the first configuration of injecting differentiated power onto the two VSC converters, following the short-circuit test.
Figure 12:
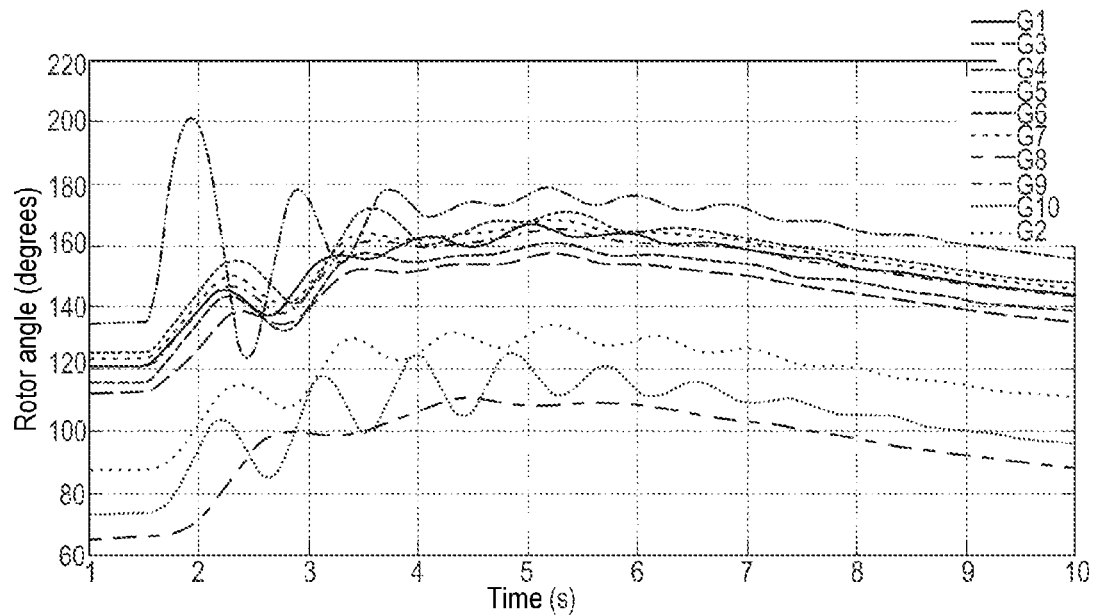
Figure 13:
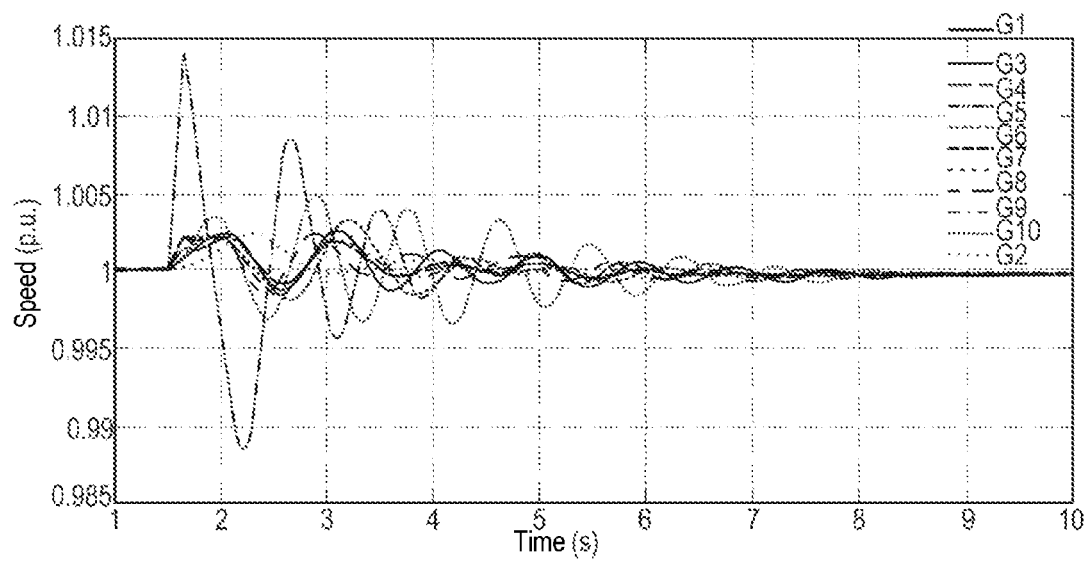

FIGS. 11, 12 and 13 respectively illustrate, in this test case B2/, the variation in power of the generators, the rotor angle and the speed of the synchronous machines.

The rotor angle and also the speed of the synchronous machines G1 to G10 are therefore stabilized.

Figure 14:
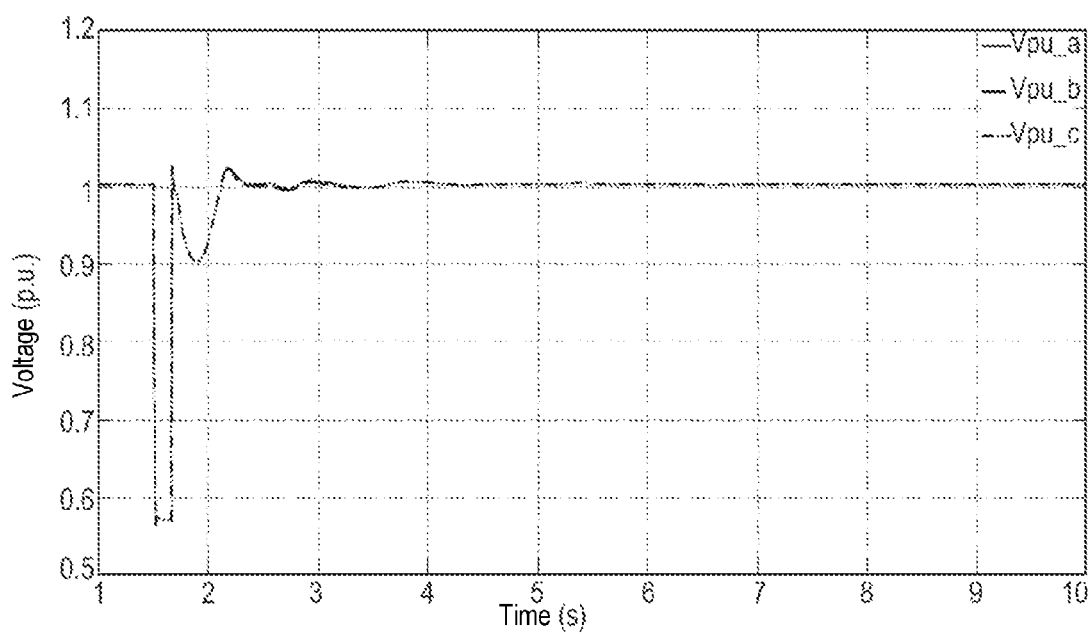
FIGS. 14 and 15 respectively illustrate the variation in voltage at a node and frequency of the New England network with the architecture according to the invention and in the first configuration of injecting differentiated power onto the two VSC converters, following the short-circuit test.
Figure 15:
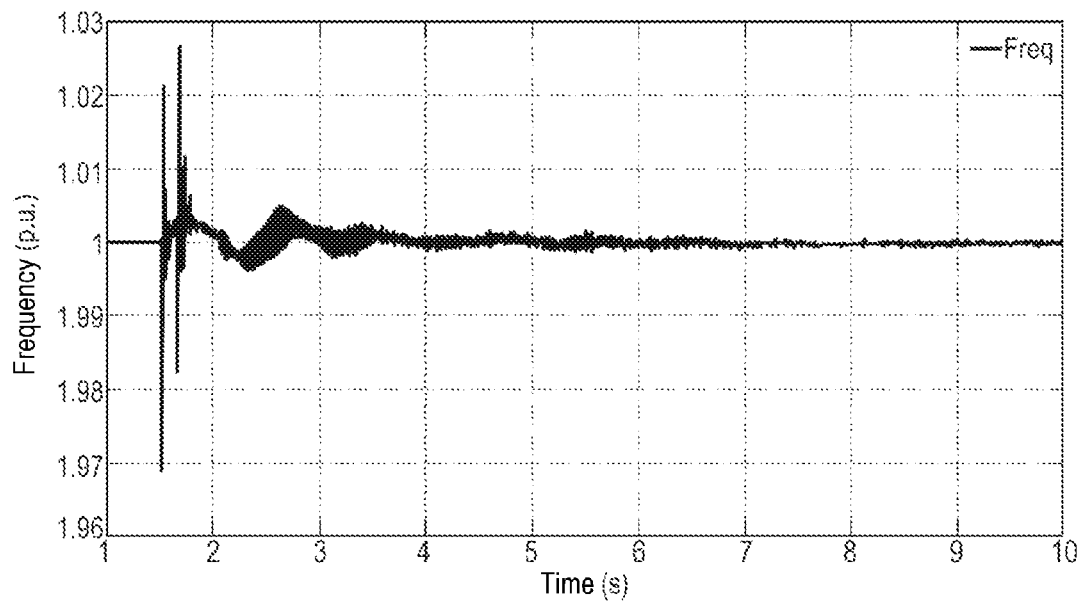

The voltage stability (FIG. 14) and the frequency stability (FIG. 15) are also observed. The service (S3) is therefore provided by the DC network of the linear installation, due to the contribution thereof to frequency regulation (S1) and voltage regulation (S2).

B3/ Consideration is given here to the DC network of a PV linear installation with the six PV groups, which injects a power with a distribution of 300 MW onto VSC_26 connected to node 26 and 0 MW onto VSC_29 connected to node 29.

Figure 16:
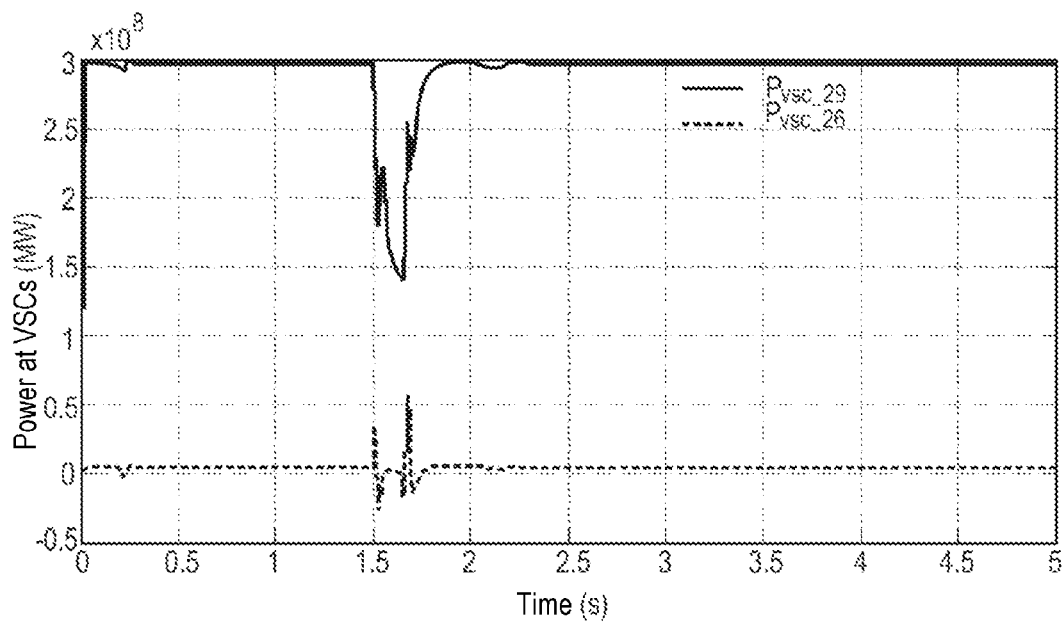
FIG. 16 illustrates the variation in power at the two VSC converters of the architecture according to the invention with the New England network and in a second configuration of injecting differentiated power onto the two VSCs, following a short-circuit test.

FIG. 16 illustrates the variation in the active powers of VSC_26 connected to node 26 and VSC_29 connected to node 29.

It is therefore observed that, in the event of a short circuit, the network is kept stable, by virtue of the highly efficient control system, via the two converters VSC_26 and VSC_29. This test case B3/demonstrates the very good resistance capability of the PV linear installations in the event of a short circuit on the AC network (S4). The converter VSC_26 is highly impacted by the short circuit as it is close to node 26, where the short-circuit point is. The converter VSC_26 participates highly actively in supplying reactive power to recover the voltage at the connection node. After the short circuit, the two converters VSC_26 and VSC_29 operate normally.

Figure 17:
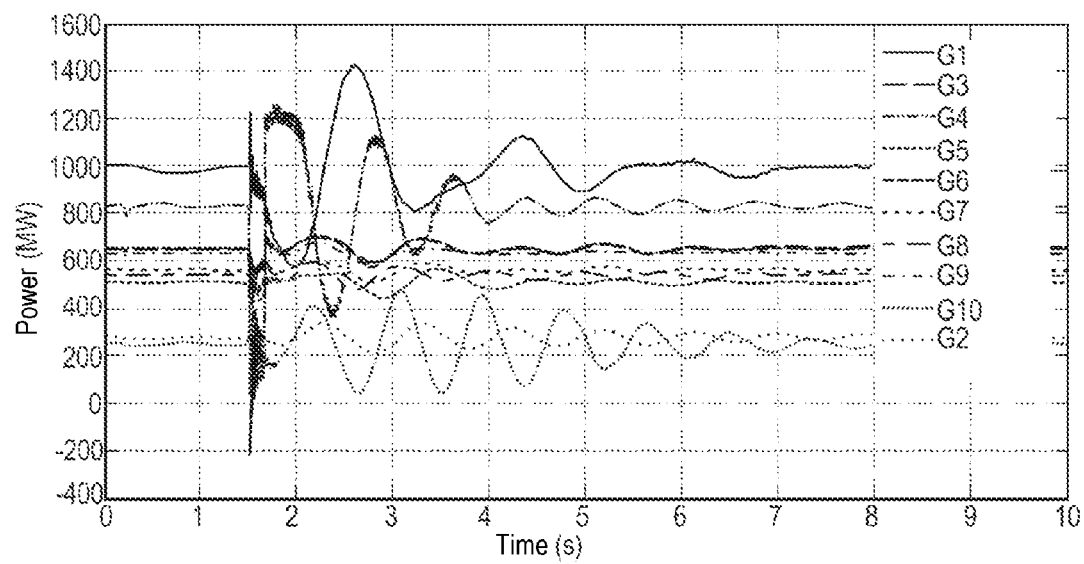
FIGS. 17, 18, 19 respectively illustrate the variation in power, rotor angle and speed of the generators (synchronous machines) of the New England network with the architecture according to the invention and in the second configuration of injecting differentiated power onto the two VSC converters, following the short-circuit test.
Figure 18:
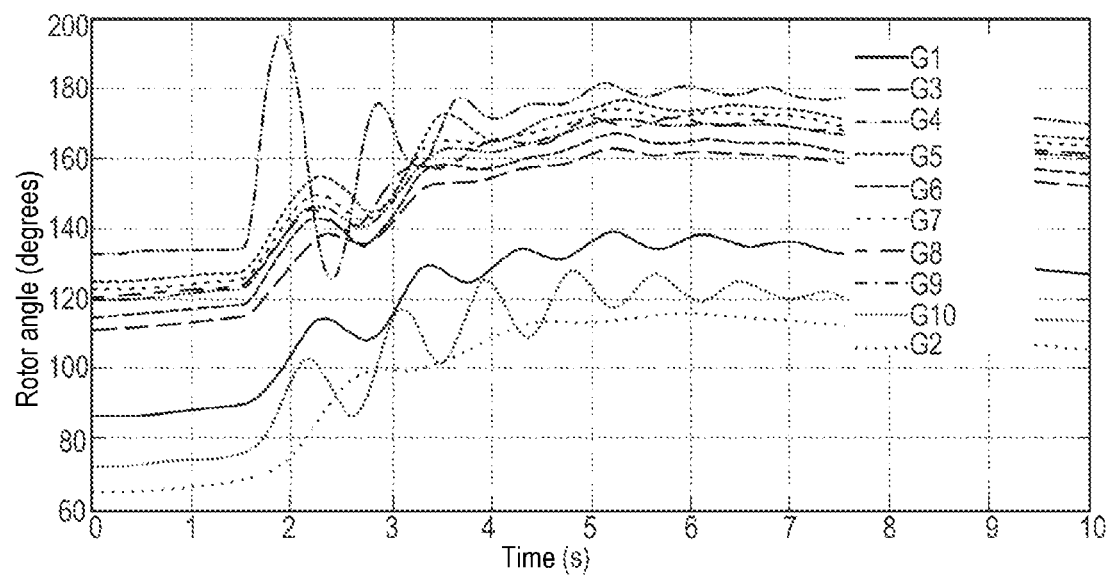
Figure 19:
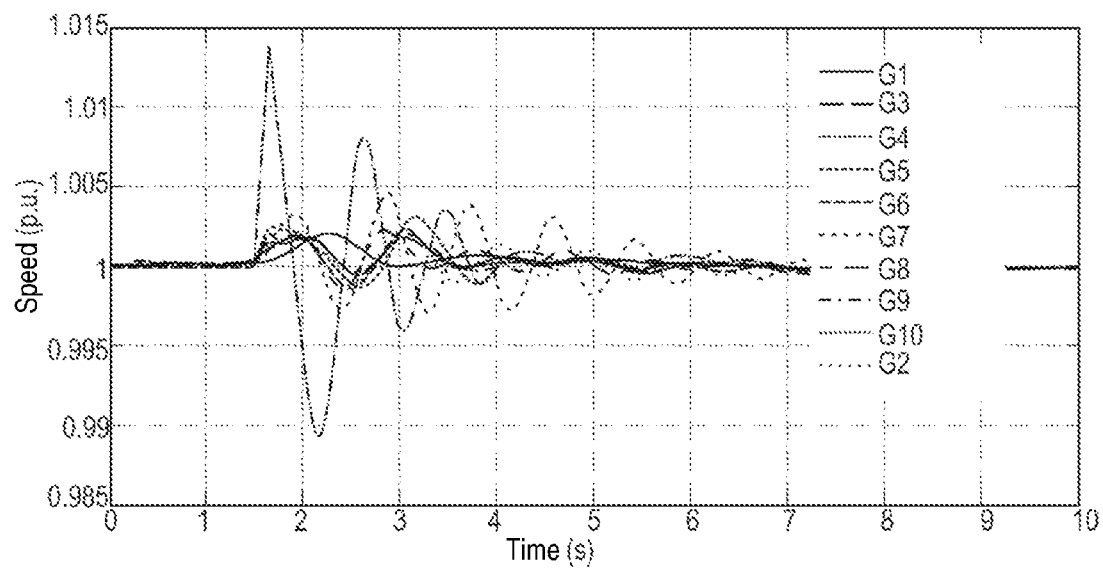

FIGS. 17, 18 and 19 respectively illustrate, in this test case B3/, the variation in power of the generators, the rotor angle and the speed of the synchronous machines.

The rotor angle and also the speed of the synchronous machines G1 to G10 are therefore stabilized.

Figure 20:
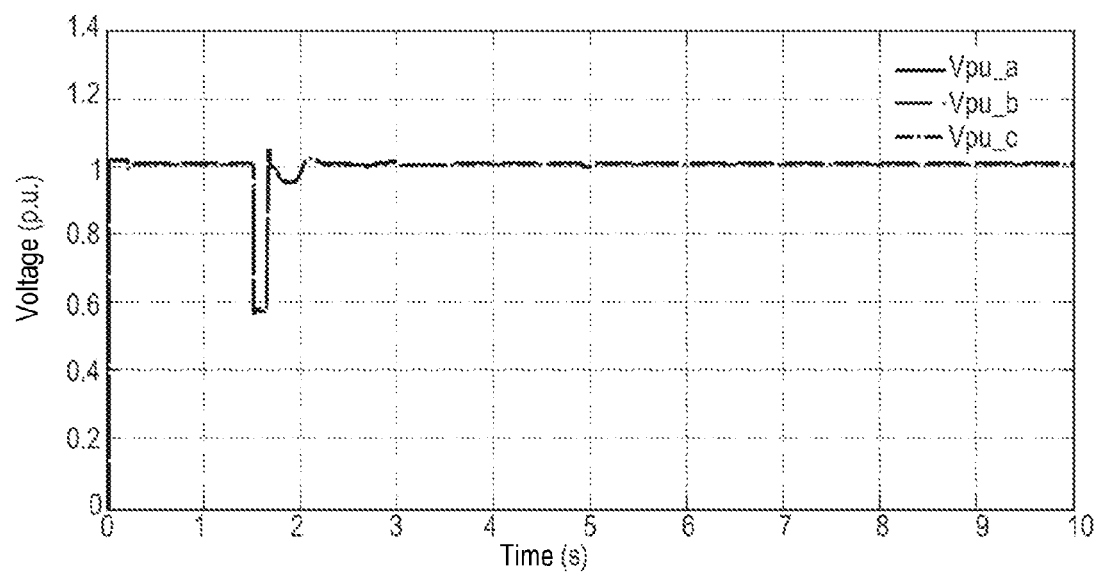
FIGS. 20 and 21 respectively illustrate the variation in voltage at a node and frequency of the New England network with the architecture according to the invention and in the second configuration of injecting differentiated power onto the two VSC converters, following the short-circuit test.
Figure 21:
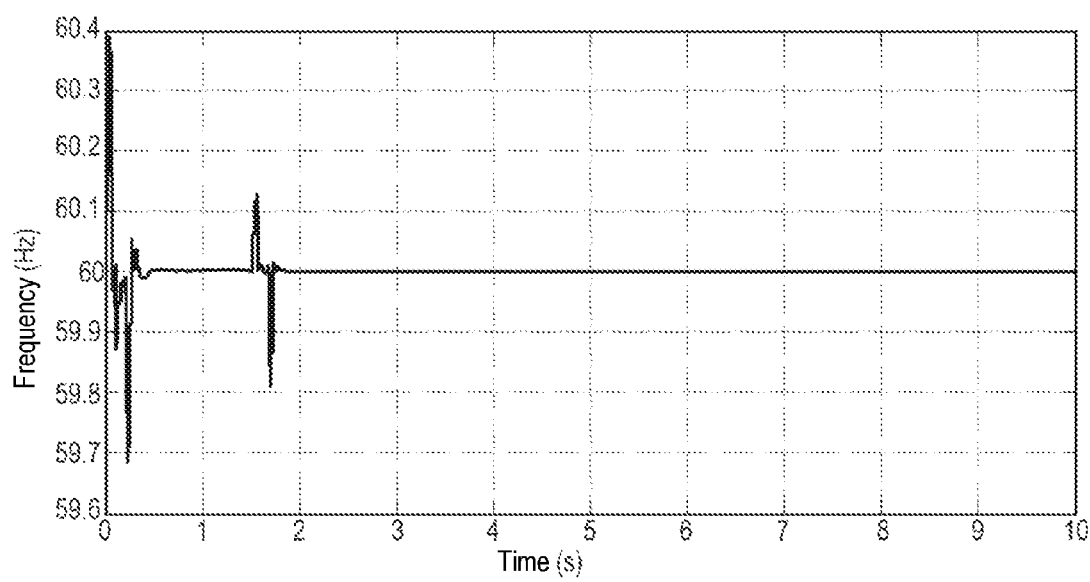

The voltage stability (FIG. 20) and the frequency stability (FIG. 21) are also observed. The service (S3) is therefore provided by the DC network of the PV linear installation, due to the contribution thereof to frequency regulation (S1) and voltage regulation (S2).

The results of tests B2/ and B3/demonstrate the support capability of the PV linear installation, regardless of the differentiated powers injected onto the VSC converters, to attenuate oscillations faced with interference in the event of a short circuit.

The invention is not limited to the examples that have just been described; it is in particular possible to combine features of the illustrated examples with one another in variants that have not been illustrated.

Other variants and embodiments may be contemplated without however departing from the scope of the invention.

LIST OF CITED REFERENCES

[1]: T. Athay, R. Podmore, and S. Virmani. "*A Practical Method for the Direct Analysis of Transient Stability*". In: IEEE Transactions on Power Apparatus and Systems PAS-98 (2 Mar. 1979), pp. 573-584.

[2]: M. A. Pai. "*Energy function analysis for power system stability*". The Kluwer international series in engineering and computer science. Power electronics and power systems. Boston: Kluwer Academic Publishers, 1989.

The invention claimed is:

1. An electrical architecture, comprising:
a linear installation comprising one or more groups of photovoltaic (PV) panels configured to produce a maximum total power P, and a direct current (DC) network comprising a DC bus to which the one or more groups of PV panels are electrically connected in parallel, each by way of a DC/DC converter,
an alternating current (AC) network including an AC transport network and/or an AC distribution network,
two voltage source converters, one of the two voltage source converters connecting the DC bus to a first node of the AC network, the other of the two voltage source converters connecting the DC bus to a second node of the AC network, distinct from the first node, each of the voltage source converters being configured to inject from 0% to a value greater than 100% of the power P into the AC network, at least one of the voltage source converters being bidirectional, and
a control system configured to determine power to be transported between the DC network from the voltage source converters and the AC network, based on the requirements and/or operating regimes of the AC network.

2. The architecture according to claim 1, wherein the DC network absorbs, at one of the first or second nodes, at least part of a power of the AC network in an event of failure thereof between the first and second nodes.

3. The architecture according to claim 2, wherein the voltage source converters are multilevel modular converters (MMC), bidirectional converters, and/or are dimensioned so as to absorb the power of the AC network.

4. The architecture according to claim 1, wherein the voltage source converters are controlled in a mode of controlling injected power and a voltage at a connection point of the AC network or in a mode of controlling active and reactive power injected into the AC network or in a mode of controlling a voltage of the DC bus and reactive power, or in a mode of controlling the voltage at the connection point and a frequency of the AC network.

5. The architecture according to claim 1, wherein the DC bus to which the one or more groups of PV panels are directly electrically connected in parallel is a medium-voltage direct current (MVDC) bus.

6. The architecture according to claim 5, wherein the MVDC bus is connected to the AC network.

7. The architecture according to claim 6, further comprising multiple geographically distributed loads, each connected to the MVDC bus by way of a DC/DC converter.

8. The architecture according to claim 5, further comprising multiple geographically distributed electricity storage devices, each connected to the MVDC bus by way of a DC/DC converter.

9. The architecture according to claim 5, further comprising geographically distributed current sources, each connected to the MVDC bus by way of a DC/DC converter.

10. The architecture according to claim 5, wherein the DC network of the PV linear installation further comprises at least one high-voltage direct current (HVDC) bus connected to the MVDC bus and to a voltage source converter connected to a node of the AC network.

11. The architecture according to claim 1, wherein the AC network includes the AC transport network, and the DC network of the PV linear installation further comprises a high-voltage direct current (HVDC) bus connected only to the AC transport network.

12. The architecture according to claim 1, wherein the control system is connected to a supervisory control and data acquisition (SCADA) system of the AC network.

13. The architecture according to claim 1, further comprising a device configured to measure a voltage and/or a frequency at the first and second nodes and being connected to the control system such that the control system distributes the power to be transported between the DC network from the voltage source converters and the AC network based on the voltage and/or frequency measurements at the first and second nodes.

* * * * *